(12) United States Patent
Liu et al.

(10) Patent No.: US 8,563,174 B2
(45) Date of Patent: Oct. 22, 2013

(54) SECONDARY BATTERY MATERIAL AND SYNTHESIS METHOD

(75) Inventors: Hongjian Liu, Hercules, CA (US);
Keith Douglas Kepler, Belmont, CA (US); Yu Wang, Foster City, CA (US)

(73) Assignee: Farasis Energy, Inc., Hayward, CA (US)

( * ) Notice: Subject to any disclaimer, the term of this patent is extended or adjusted under 35 U.S.C. 154(b) by 888 days.

(21) Appl. No.: 11/717,272

(22) Filed: Mar. 13, 2007

(65) Prior Publication Data

US 2007/0212608 A1    Sep. 13, 2007

Related U.S. Application Data

(60) Provisional application No. 60/781,886, filed on Mar. 13, 2006.

(51) Int. Cl.
*H01M 4/13* (2010.01)
(52) U.S. Cl.
USPC ................. 429/231.1; 429/231.6; 429/231.95
(58) Field of Classification Search
USPC ............................. 429/231.1, 231.6, 231.95
See application file for complete search history.

(56) References Cited

U.S. PATENT DOCUMENTS

| | | | |
|---|---|---|---|
| 6,489,060 B1 | 12/2002 | Zhang et al. | |
| 2003/0108790 A1* | 6/2003 | Manthiram et al. | 429/218.1 |
| 2003/0148183 A1* | 8/2003 | Yamasaki | 429/231.1 |
| 2003/0180615 A1 | 9/2003 | Johnson et al. | |
| 2004/0228965 A1 | 11/2004 | Lee et al. | |
| 2005/0053545 A1* | 3/2005 | Liu et al. | 423/594.15 |
| 2006/0204845 A1* | 9/2006 | Chang et al. | 429/209 |

OTHER PUBLICATIONS

Liu, Z.L, et., Improving the high-temperature performance of LIMn2O4 spinel by micro-emulsion coating of LiCoO2, Journal of Power sources, 2002, 101-107, 104.
Kannan, A.M., et., surface/Chemically Modified LiMn2O4 Cathodes for Lithium-ion Batteries, Electrochemical and Solid-State Letters, 2002, A167-A169, 5(7).
Park, S.C., et., Improving of the Rate Capability of LiMn2O4 by surface Coating with LiCoO2, Journal of Power Sources, 2001, 86-92, 103.
Ying, J.O., et., Surface Treatment of LiNi0.8Co0.2O2 Cathode Material for Lithium Secondary Batteries, Journal of Power Sources, 2001, 162-166, 102.
Cho, J., et., Complete Blocking of Mn3+ Ion Dissolution from a LiMn2O4 Spinel Intercalation Compound by Co3O4 Coating, Chemcommm Communication, 2001, 1074-1075.

* cited by examiner

*Primary Examiner* — Jane Rhee
(74) *Attorney, Agent, or Firm* — James Cai; Schein & Cai LLP

(57) ABSTRACT

A composite $Li_{1+x}Mn_{2-x-y}M_yO_4$ cathode material stabilized by treatment with a second transition metal oxide phase that is highly suitable for use in high power and energy density Li-ion cells and batteries. A method for treating a $Li_{1+x}Mn_{2-x-y}M_yO_4$ cathode material utilizing a dry mixing and firing process.

1 Claim, 4 Drawing Sheets

SECONDARY BATTERY MATERIAL AND SYNTHESIS METHOD

RELATED APPLICATIONS

This patent claims the benefit of Provisional Patent Application Ser. No. 60/781,886, filed Mar. 13, 2006, the disclosure of which is herein incorporated by reference in its entirety.

FEDERALLY SPONSORED RESEARCH

The invention was made under support of the United States Government, Department of Energy, Small Business Innovative Research Grant Number DE-FG02-03ER83868. The United States has certain rights in the invention.

SEQUENCE LISTING OR PROGRAM

Not Applicable

FIELD OF THE INVENTION

The present invention relates to a method by which a lithium metal oxide cathode material can be modified for improved performance in a Li-ion cell and the resulting composite cathode material. More particularly, this invention relates to a method and the specific processes by which lithium manganese oxide spinel can be treated with a second lithium containing metal oxide phase utilizing a dry mixing and secondary firing process to produce a composite cathode material with higher capacity and longer cycle life.

BACKGROUND OF THE INVENTION

Lithium ion cells have become attractive for portable electronic devices such as cellular phones and laptop computers as they offer higher energy density than other rechargeable systems. Commercial lithium-ion cells currently have a lithiated carbon negative electrode, or anode, $Li_xC_6$, and a lithium cobalt oxide positive electrode, or cathode, $LiCoO_2$. During charge and discharge of the cell, Li ions are transported back and forth between the anode and cathode and intercalated into the host structures. The most common cathode material, $LiCoO_2$, has a layered structure and operates at approximately 4 V vs. lithiated carbon. Unfortunately it is relatively expensive and is highly reactive in the oxidized or de-lithiated state, leading to safety concerns at high states of charge. The high reactivity also affects the life of the cell, the rate capability and generally prevents its use in cells larger than 18650 size, the conventional size of cell used in computer laptops.

Other materials are being developed as alternatives to $LiCoO_2$. In particular the isostructural materials $LiNiCoO_2$ and $LiNiMnO_2$ have been proposed as alternatives. However, they also suffer from stability problems at high states of charge which limit their use in larger cells and in some cases have poor rate capability. More recently $LiFePO_4$ has been developed as an alternative to these materials. While these materials are inherently safer because of their low voltage (3.5 V vs Li), these materials have inherently poor rate capability and low volumetric energy density when using conventional Li-ion cell building manufacturing processes. Engineering approaches have been used to improve their rate capability, though this leads to an even lower energy density system. Thus it is highly desirable to find new cathode materials that are both safe, high rate with reasonable energy density that can be to make larger Li-ion cells for the growing power tool, hybrid electric vehicle and stationary power markets.

The spinel electrode material $LiMn_2O_4$ is highly attractive for these applications because of its low cost, low toxicity and much greater safety. However, the $LiMn_2O_4$ electrode material tends to exhibit capacity fade in the Li-ion cell environment during cycling that is particularly severe above 45° C. A number of factors have been reported to be responsible for the capacity fade, many of which are related to the reactivity of the manganese spinel surface. For example, the dissolution of $Mn^{2+}$ into the electrolyte has been reported to result from a disproportionation reaction of $Mn^{3+}$ in contact with the electrolyte according to the reaction: $2Mn^{3+}_{(solid)} \rightarrow Mn^{4+}_{(solid)} + Mn^{2+}_{(solution)}$.

Several attempts have been made to overcome the problems of capacity fade associated with $LiMn_2O_4$ materials. For example, cationic substitution for manganese changes the average oxidation state of the Mn ions to above 3.5, thus reducing the amount of $Mn^{3+}$ ions in the fully discharged electrode. This approach has been shown to improve the capacity retention of the material at high temperatures. However, this approach also results in a significant decrease in the specific capacity of the spinel material. Other approaches have been taken such as protecting the material with a complete surface coating. For example, coating the material with a low temperature borate glass, with metal oxides/organics ($Al_2O_3$, MgO, YtO) or a coating of another Li-ion cathode active material such as $LiCoO_2$ or $LiNiCoO_2$. Although some success has been achieved, many of the approaches used are often expensive, difficult to control and difficult to implement at large volumes. The approaches also lead to large capacity loss or poor rate capability materials. There is still a need for further improvement in capacity retention in $LiMn_2O_4$ based lithium ion cells and for improvement of the state of the art protective coatings on these electrodes to improve the overall performance and safety of Li-ion cells.

SUMMARY OF THE INVENTION

The invention relates to a modified $Li_{1+x}Mn_{2-x-y}M_yO_4$ ($0 \leq x \leq 0.5$, $0 \leq y \leq 1$) spinel positive electrode material for non-aqueous lithium ion cells and batteries with improved cycle life and capacity. More specifically the invention relates to an efficient method by which a manganese spinel cathode substrate material can be treated with a lithium transition metal containing oxide species to impart a stabilizing effect through modification of the substrate surface with minimal negative effects on the material capacity and rate capability; the cathode material that is produced by such a method; and Li-ion cells built with such a cathode material. It is, therefore, one object of the invention to provide a method for the treatment of a lithium manganese oxide spinel cathode material for lithium ion secondary cells to produce a material that is resistant to capacity loss at high temperatures, has high rate capability and is safe to overcharge conditions. The treatment method of this invention involves dry mixing the base manganese oxide spinel cathode active material with lithium transition metal oxide precursors such as lithium acetate, lithium nitrate, and/or cobalt nitrate or cobalt acetate. For the purposes of this invention, dry mixing is defined as mixing two or more components without additionally adding a solvent phase. The component ratio of the mixture corresponds to the formation of a final composite cathode material comprising 1%-8% by weight lithium transition metal oxide added to the base lithium manganese oxide spinel. After mixing, the mixture is fired in air between 300° C. and 800° C. with no prior drying or solvent evaporation step, or more preferably between 500° C. and 700° C. with no prior drying or solvent evaporation step. In one embodiment the mixing method specifically forms only a partial surface coating on the base manganese oxide spinel cathode active material.

Another embodiment of this invention is a composite cathode material formed by this method. Such a material comprises a base $Li_{1+x}Mn_{2-x-y}M_yO_4$ ($0 \leq x \leq 0.5$, $0 \leq y \leq 1$) spinel positive electrode material with a surface layer having the nominal composition $Li_yCo_{1-x}M_xO_2$ ($0 \leq y \leq 1$, $0 \leq x \leq 1$) where M=Ni, Mn, Al or Mg. More preferably the material will comprise a core $Li_{1+x}Mn_{2-x}O_4$ ($0 \leq x \leq 0.5$) composition with a compositionally heterogeneous surface layer comprised of a $LiYCoO_2$ ($0 \leq y \leq 1$) phase and the core $Li_{1+x}Mn_{2-x}O_4$ ($0 \leq x \leq 0.5$) phase, such a material being suitable for Li-ion cells and batteries. In one embodiment of this invention, the composite cathode material exhibits a heterogeneous surface composition comprising manganese containing regions and cobalt containing regions. Another embodiment of this invention comprises Lithium ion cells and batteries utilizing the cathode material of this invention.

Additional advantages of the invention will become readily apparent to those skilled in the art from the following detailed description, wherein only the preferred embodiments of the invention are shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature and not as restrictive.

DETAILED DESCRIPTION OF THE INVENTION

Figure 1:
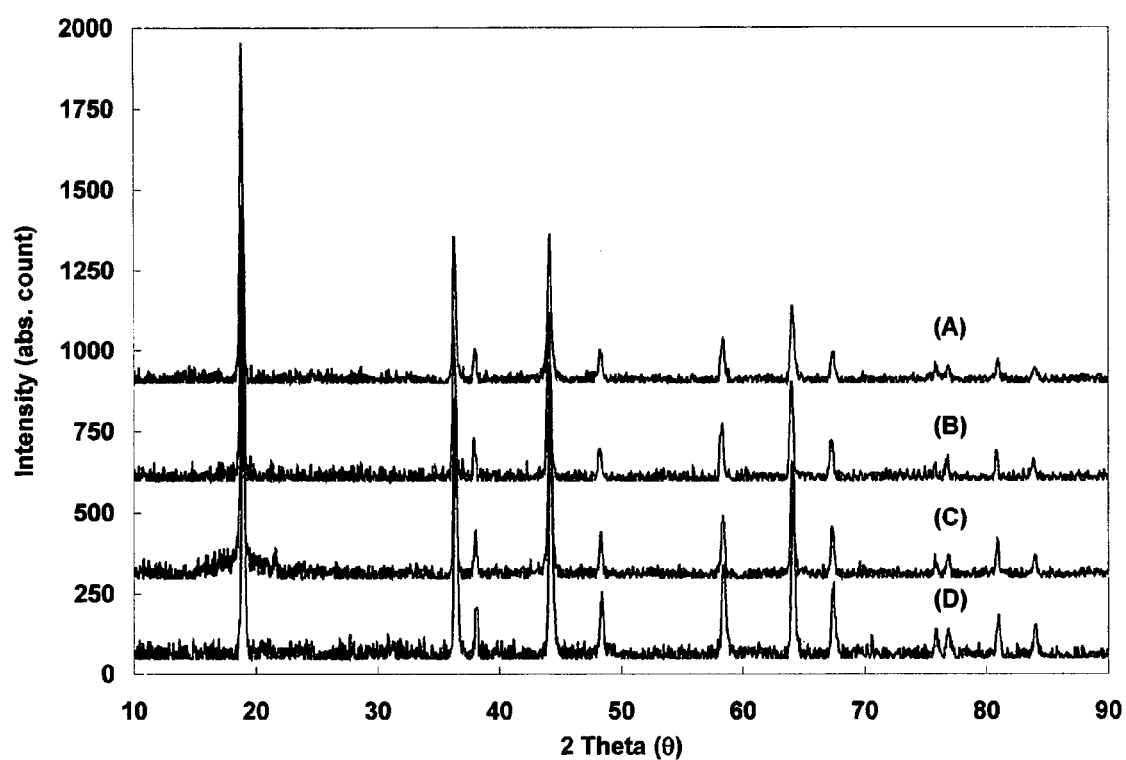
FIG. 1 graphically depicts the powder X-ray diffraction spectra of untreated $Li_{1.05}Mn_{1.95}O_4$ and three $Li_{1.05}Mn_{1.95}O_4$ samples modified with $LiCoO_2$ by methods as described in Comparative Examples 1 and 2 and Example 1.

The present invention relates to a $Li_{1+x}Mn_{2-x-y}M_yO_4$ ($0 \leq x \leq 0.5$, $0 \leq y \leq 1$) spinel positive electrode material with a modified surface for non-aqueous lithium cells and batteries with improved cycle life and capacity and the methods for making such a material. More specifically the invention relates to an efficient method by which a lithium manganese oxide spinel cathode material can be treated with a lithium transition metal containing species to impart a protective layer on the manganese spinel cathode material; the cathode material that is produced by such a method; and Li-ion cells built with such a cathode material. It is, therefore, one object of the invention to provide a method for the treatment of a lithium manganese oxide spinel cathode material for lithium ion secondary cells to produce a material that is resistant to capacity loss at high temperatures, has high rate capability and is safe to overcharge conditions.

Previous methods developed to form various protective coatings onto lithium manganese oxide spinel electrodes have involved several general steps including: (1) First forming a liquid solution of treatment phase precursors using a solvent for the precursors; (2) Long term mixing of the lithium manganese oxide spinel cathode base material in the liquid precursor solution; (3) Evaporation of the liquid phase by slow heating; (4) Drying the solid mixture at low temperature and (5) Firing the solid mixture. The use of a liquid mixing phase has generally been viewed as necessary to insure that the protective coating phase is completely and uniformly spread across the entire exposed surface of the lithium manganese oxide particles and that only this result will lead to improved high temperature cycle life performance of the lithium manganese oxide spinel cathode. Several groups have demonstrated at the lab scale that this method does result in the complete coverage of the lithium manganese oxide spinel cathode particle surface with the surface treatment phase and that some improved cycle life performance is observed for the treated materials at higher temperature. However, negative effects have also been observed including major loss of capacity of the coated material and poor rate capability. Furthermore, the performance of a non-aqueous Li-ion cell can be greatly affected by residual water of species from the process. It is also a problem that the liquid phase methods are not practical for implementation at high volume production because of the added cost and complexity of the coating steps. Particularly, evaporation of the liquid phase is very difficult and expensive to scale up.

Thus the treatment method of this invention involves dry mixing, wherein no solvent phase is added in addition to the precursor phases being mixed and subsequently there is no additional step specifically for solvent evaporation. The steps of the method of this invention include first weighing out the base lithium manganese oxide material and the precursor materials for the secondary lithium transition metal oxide phase such that decomposition of the precursor materials will produce the specific weight ratio of the base phase to surface phase desired. The second step involves dry mixing the base manganese oxide spinel cathode active material with the lithium transition metal oxide precursors such as lithium acetate or lithium nitrate, and cobalt nitrate or cobalt acetate. For example, the materials can be weighed out and mixed in a roll mill utilizing ceramic balls for 5-20 hours. The component ratio of the mixture corresponds to the formation of a final treated cathode material comprising 1%-8% by weight lithium transition metal oxide surface treatment phase added to the active manganese oxide spinel. In the third step the mixture is fired in air between 300° C. and 800° C. with no prior drying step, or more preferably between 500° C. and 700° C. with no prior drying step. The final material may be sieved or otherwise processed to modify or control the particle size distribution and morphology. The method of this invention is relatively easy to implement on the large scale necessary for use in Li-ion cells. It has been observed that this method does not necessarily result in the complete coverage of the base lithium manganese oxide surface with the surface treatment phase. In one embodiment the mixing method forms only a partial surface coating on the base manganese oxide spinel cathode active material.

Another embodiment of this invention is a composite cathode material with a bi-functional surface layer formed primarily by this method. Such a material comprises a core $Li_{1+x}Mn_{2-x-y}M_yO_4$ ($0 \leq x \leq 0.5$, $0 \leq y \leq 1$) spinel positive electrode material with significant regions of the particle surface having the nominal composition $Li_yCO_{1-x}M_xO_2$ ($0 \leq y \leq 1$, $0 \leq x \leq 1$) where M=Ni, Mn, Al or Mg. More preferably the material will consist of $Li_{1+x}Mn_{2-x}O_4$ ($0 \leq x \leq 0.5$), where the surface is only partially modified with or chemically connected to $LiYCoO_2$ ($0 \leq y \leq 1$) to form a composite cathode material with a bi-functional surface layer suitable for Li-ion cells and batteries. Even more preferable the primarily lithium manganese oxide core phase will comprise less than 50% of the particle surface but greater than 5% and the primarily lithium cobalt oxide phase shall comprise greater than 50% of the particle surface but not more than 95%. As stated earlier previous methods and materials wherein the lithium manganese oxide cathode material is coated with a second lithium transition metal oxide material using a liquid based method results in complete coverage of the base lithium manganese oxide cathode surface with the coating phase. We have unexpectedly found that materials prepared by the dry mixing method of this invention do not have complete surface coverage of the lithium manganese oxide cathode material by the surface treatment phase, yet their cycle life and capacity is superior to those prepared by the liquid method. Thus the particles of the treated cathode materials prepared by the dry mix method have a surface that consists of discrete regions of lithium manganese oxide phase and the surface treatment phase (for example $LiCoO_2$). We believe that the strong electrical contact between the base lithium manganese oxide cathode material and the surface treatment phase provides a cathode material wherein the surface treatment phase imparts an average redox stability to the base lithium manganese oxide surface that prevents accelerated degradation at high temperatures in a Li-ion cell even for the exposed surface regions of the base lithium manganese oxide material. In turn the regions of exposed lithium manganese oxide surface phase provides for high rate lithium intercalation and overall greater rate capability and capacity retention for the treated material.

Thus the dry mixing method and the resulting partial surface coverage of the base lithium manganese oxide spinel material with a lithium cobalt oxide phase produces a new material with bi-functional characteristics, exhibiting greater capacity retention at high temperatures while preserving much of the performance advantages, such as rate capability and low impedance growth of the core lithium manganese oxide spinel material. Such a partially surface modified lithium manganese oxide cathode material has performance and stability advantages over both simple physical mixing of the lithium manganese oxide cathode powder material with a $LiCoO_2$ powder material and over lithium manganese oxide cathode materials that have been fully coated with a stabilization phase like $LiCoO_2$ using a liquid coating method.

COMPARATIVE EXAMPLE 1

$LiCoO_2$ Surface Modified $Li_{1.05}Mn_{1.95}O_4$ by Aqueous Sol-Gel Method

For comparison two different wet-process methods were used to modify the surface of same base lithium manganese oxide spinel cathode material with 5% $LiCoO_2$ by weight including the sol-gel process described in this example. To prepare the surface modified $Li_{1.05}Mn_{1.95}O_4$ cathode material using the sol-gel method, sufficient acetate salts of lithium and cobalt were weighed out to produce a final material composition containing 5% $LiCoO_2$ by weight. The acetate salts were dissolved in distilled water. The solution was placed on a hot plate and heated to 250° C. to boil off the water. Once a gel began to form as the water evaporated, methanol was slowly added while stirring to produce a viscous solution. The base $Li_{1.05}Mn_{1.95}O_4$ powder was slowly added to the sol-gel solution and mixed using an overhead stirrer. The methanol was evaporated and then the mixture was dried further in an oven at 110° C. for 3 hours. The dried material was ground up using a mortar and pestle and then fired in air at 700° C. for 8 hours.

COMPARATIVE EXAMPLE 2

$LiCoO_2$ Surface Modified $Li_{1.05}Mn_{1.95}O_4$ by Aqueous Solvent Based Method To prepare the surface modified $Li_{1.05}Mn_{1.95}O_4$ cathode material by the aqueous method sufficient acetate salts of lithium and cobalt were weighed out to produce a final cathode material composition containing 5% $LiCoO_2$ by weight. The acetate salts were dissolved in a small amount of distilled water and the base lithium manganese oxide spinel was added to the salt solution. The solution was stirred over a hot plate at 250° C. until the water had completely evaporated. The mixture was dried further in an oven at 110° C. for 3 hours and then fired in air at 700° C. for 8 hours.

EXAMPLE 1

$LiCoO_2$ Surface Modified $Li_{1.05}Mn_{1.95}O_4$ by Dry Nitrate Salt Method

The same $Li_{1.05}Mn_{1.95}O_4$ powder used in Comparative Examples 1 and 2 was used as the base lithium manganese oxide spinel material in this example of the method of this invention. The solid state coating method was used to treat the base material as follows to produce a final composite material containing approximately 5% by weight, $LiCoO_2$. 95 grams of the base $Li_{1.05}Mn_{1.95}O_4$ cathode material was weighed out and placed in to a 250 ml roll mill container. 3.52 g of $LiNO_3$ and 14.86 g of $Co(NO_3)_2$ were weighed out and placed into the same 250 ml roll mill container with the base lithium manganese oxide spinel. Fifty ceramic mixing balls were placed into the roll mill container and the container was sealed shut. The container and its contents were placed onto a Roll Mill apparatus and roll-milled for 12 hours. The roll-milled mixture of $Li_{1.05}Mn_{1.95}O_4$ and the lithium and cobalt salts was removed and immediately fired in a furnace under air at 700° C. for 8 hours.

EXAMPLE 2

$LiCoO_2$ Surface Modified $Li_{1.05}Mn_{1.95}O_4$ by Dry, Acetate Salt Method

The same method as described in Example 1 was followed in this example using lithium acetate and cobalt acetate salts as the $LiCoO_2$ phase precursors. 95 grams of the base $Li_{1.05}Mn_{1.95}O_4$ cathode material was weighed out and placed in to a 250 ml roll mill container. 5.21 g of Li-acetate and 12.72 g of Co-acetate were weighed out and placed into the same 250 ml roll mill container with the base lithium manganese oxide spinel. Fifty ceramic mixing balls were placed into the roll mill container and the container was sealed shut. The container and its contents were placed onto a Roll Mill apparatus and roll-milled for 12 hours. The roll-milled mixture of $Li_{1.05}Mn_{1.95}O_4$ and the lithium and cobalt salts was removed and immediately fired in a furnace under air at 700° C. for 8 hours.

EXAMPLE 3

$LiCoO_2$ Surface Modified $LiMn_2O_4$ by Dry, Nitrate Salt Method

The same method as described in Example 1 was followed in this example using lithium nitrate and cobalt nitrate salts as the $LiCoO_2$ phase precursors. 95 grams of the base $LiMn_2O_4$ cathode material was weighed out and placed in to a 250 ml roll mill container. 3.52 g of Li-nitrate and 14.86 g of Co-nitrate were weighed out and placed into the same 250 ml roll mill container with the base lithium manganese oxide spinel. Fifty ceramic mixing balls were placed into the roll mill container and the container was sealed shut. The container and its contents were placed onto a Roll Mill apparatus and roll-milled for 12 hours. The roll-milled mixture of $LiMn_2O_4$ and the lithium and cobalt salts was removed and immediately fired in a furnace under air at 700° C. for 8 hours.

Powder X-ray diffraction patterns of the samples prepared as described in Comparative Examples 1 and 2 and Examples 1-3 were collected on a Siemens D5000 powder diffractometer with Cu $K_\alpha$ radiation between 15° and 75° 2θ at a scan rate of 0.02° 2θ/12 seconds. FIG. 1 graphically depicts the X-ray diffraction patterns for the 5% $LiCoO_2$ coated $Li_{1.05}Mn_{1.95}O_4$ coated by three different methods as compared to the uncoated material. The four diffraction patterns are A) Baseline $Li_{1.05}Mn_{1.95}O_4$, B) Comparative Example 1—$LiCoO_2$ Surface Modified $Li_{1.05}Mn_{1.95}O_4$ by Aqueous Sol-Gel Method, C) Comparative Example 2—$LiCoO_2$ Surface Modified $Li_{1.05}Mn_{1.95}O_4$ by Aqueous Solvent Based Method; D) Example 1—$LiCoO_2$ Surface Modified $Li_{1.05}Mn_{1.95}O_4$ by Dry Nitrate Salt Method. Under the conditions used there is little change in the diffraction pattern of the base $Li_{1.05}Mn_{1.95}O_4$ material indicating that the bulk of the manganese oxide spinel phase is not greatly affected by the treatment. The presence of a crystalline $LiCoO_2$ phase is not observed. This is either due to its low concentration, its small crystalline domain size or both.

Scanning Electron Microscopy and Energy Dispersive Spectroscopy were used to determine the morphology and surface composition of the $LiCoO_2$ treated $Li_{1.05}Mn_{1.95}O_4$ materials. The particle size of the materials was similar to that of the original, untreated $Li_{1.05}Mn_{1.95}O_4$. Surface compositional determination of the sol-gel and aqueous coated material of Comparative Examples 1 and 2 by energy dispersive spectroscopy indicated that in both cases, the particle surface had no major regions of a primarily manganese containing phase. Surface compositional determination of the materials prepared by dry mixing as described in Examples 3 and 4 by energy dispersive spectroscopy indicated that in both cases, selected particle surfaces had significant numbers of regions, estimated to range from 20-30% of the surface area, that did not show the presence of a cobalt containing phase. Thus the solid-state treatment method produces a cathode material wherein the surface has a heterogeneous composition comprising separate regions that are primarily manganese containing and regions that are primarily cobalt containing. In contrast, the samples made utilizing solution based or wet methods exhibited a more homogeneous surface layer dominated by a Cobalt containing species.

EXAMPLE 4

Preparation of an Electrochemical Cell with $LiCoO_2$ Modified Cathodes

The cathode materials $LiMn_2O_4$, $Li_{1.05}Mn_{1.95}O_4$, and $Li_{1.16}Mn_{1.84}O_4$ and the materials made by methods described in Comparative Examples 1 and 2 and Examples 1-3 were evaluated in coin cells against a counter lithium electrode. The coin cells were Size 2032, with dimensions 20 mm and 3.2 mm high. The cells had the configuration: Li/1M $LiPF_6$ in 1:1 ethylene carbonate:diethyl carbonate/cathode material. The electrodes were fabricated with the modified or unmodified spinel cathode materials by preparing a slurry of the cathode material, acetylene black and Polyvinylidene difluoride binder (90%/4%/6%) in n-methylpyrolidinone. The slurry was coated onto an Al foil current collector and dried under vacuum at 80° C. Electrodes were punched from the coating and used to make the coin cells. Metallic Lithium foil was used as the counter electrode. The coin cells were charged and discharged at a constant current within the voltage range of 3.2V-4.25 V. The cells were cycled in an incubator set at 65° C.

Figure 2:
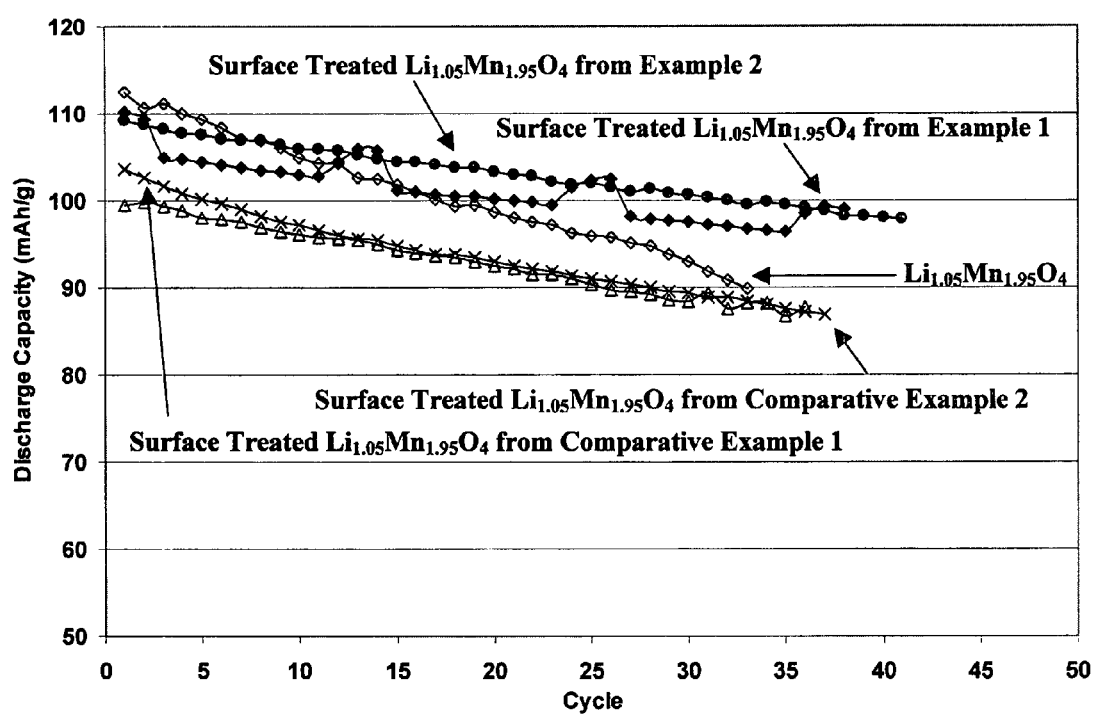
FIG. 2 graphically depicts the discharge capacity profiles at 65° C. of four $LiCoO_2$ modified $Li_{1.05}Mn_{1.95}O_4$ materials prepared by methods described in Comparative Examples 1 and 2 and Examples 1 and 2 and the unmodified $Li_{1.05}Mn_{1.95}O_4$ material.

The electrochemical voltage profiles of all of the treated and untreated baseline materials were similar, independent of the method used to prepare them. FIG. 2 is a graphical depiction of the discharge capacity vs. cycle number for the materials synthesized by methods described in Comparative Example 1 and 2 and Examples 1 and 2 wherein the base spinel cathode material was the lithium rich spinel, $Li_{1.05}Mn_{1.95}O_4$. All of the coin cells were cycled at a constant current, C/5 rate (5 hours for 100% discharge) except the cell made with the material using the solid state nitrate coating method, Example 1, which was cycled repeatedly at a higher 1 C rate for 10 cycles followed by three C/5 cycles. The two cathode materials prepared by the solid-state methods described in Examples 1 and 2 show a much greater improvement in the cycling stability over the untreated $Li_{1.05}Mn_{1.95}O_4$ material. The materials made by the sol-gel and aqueous synthesis methods described in Comparative Examples 1 and 2 show a loss of initial capacity and some cycling stability improvement over the baseline material at this temperature after 40 cycles. The data illustrates that the fade rate of the materials coated using the solid state methods described in Examples 1 and 2 exhibit greater capacity retention at high temperatures as compared to the base spinel material or the materials treated utilizing the sol-gel or aqueous methods described in Comparative Examples 1 and 2. Thus the cathode materials made using the solid state coating method of this invention have both higher capacity and better capacity retention than the other methods.

Figure 3:
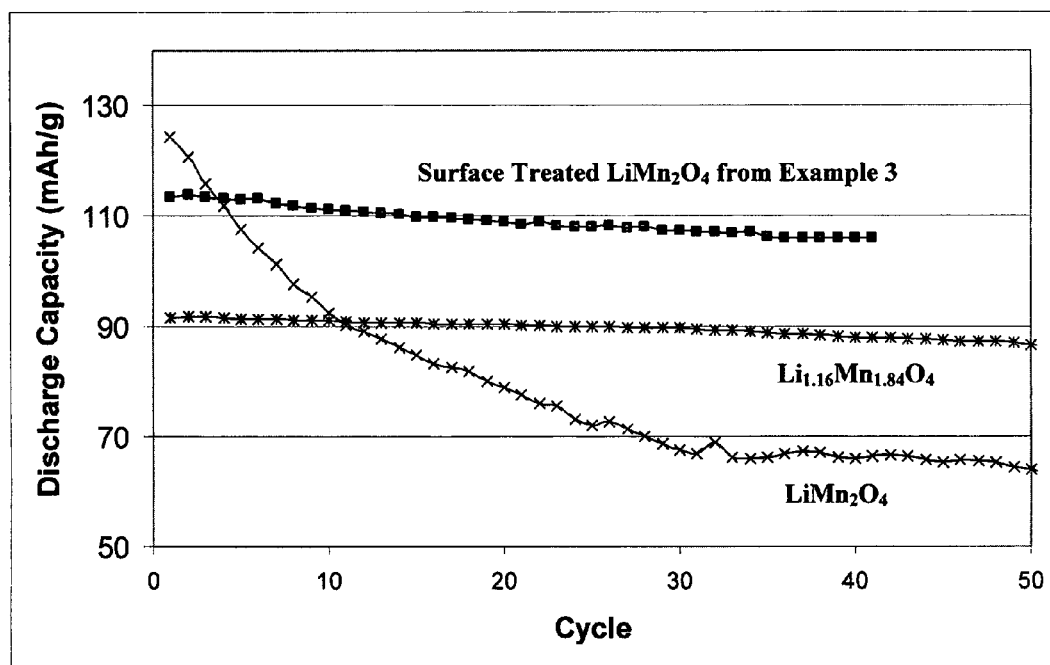
FIG. 3 graphically depicts the discharge capacity profiles at 65° C. of an untreated cathode material with composition $LiMn_2O_4$, a treated cathode material with composition $Li_{1.05}Mn_{1.95}O_4$ and a $LiCoO_2$ modified $LiMn_2O_4$ cathode prepared by methods of this invention as described in Example 3.
Figure 4:
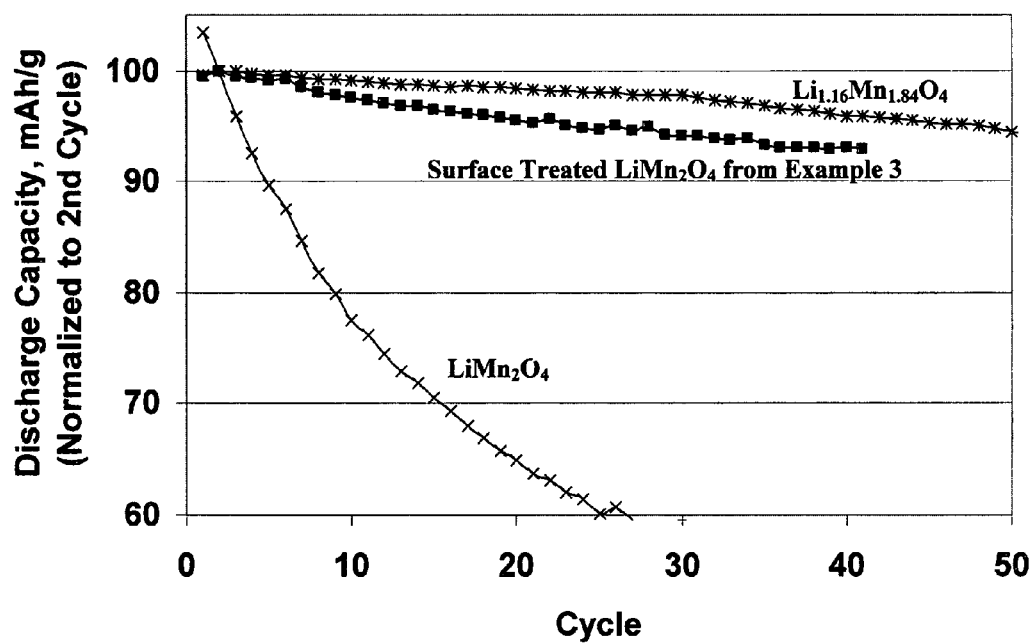
FIG. 4 graphically depicts the normalized discharge capacity profiles at 65° C. of an untreated cathode material with composition $LiMn_2O_4$, a treated cathode material with composition $Li_{1.05}Mn_{1.95}O_4$ and a $LiCoO_2$ modified $LiMn_2O_4$ cathode prepared by methods of this invention as described in Example 3.

FIG. 3 is a graphical depiction of the cycle performance of a coin cell made using a 5% $LiCoO_2$ treated $LiMn_2O_4$ cathode prepared by the method described in Example 3 as compared to the base $LiMn_2O_4$ and to a highly lithium rich $Li_{1.16}Mn_{1.84}O_4$ cathode material. The stoichiometric $LiMn_2O_4$ cathode exhibits the greatest initial capacity and the lithium rich spinel exhibits a much lower initial capacity. The 5% $LiCoO_2$ treated $LiMn_2O_4$ material prepared as described in Example 3 has an initial capacity similar to the base $LiMn_2O_4$ material, however its capacity retention is similar to the highly lithium rich cathode $Li_{1.16}Mn_{1.84}O_4$. FIG. 4 is graphical depiction of the normalized discharge capacity vs cycle number of the same cells illustrating the greatly improved capacity stability of the 5% $LiCoO_2$ coated $LiMn_2O_4$ vs the base $LiMn_2O_4$ material. Thus the solid state coating method produces a cathode material that is both high capacity and highly stable when using the stoichiometric spinel as the base material.

The examples and data provided above demonstrate the principles of this invention. In particular, they demonstrate that the solid-state method for treating a base lithium manganese oxide spinel cathode material with lithium cobalt oxide has little effect on the bulk manganese oxide spinel cathode and results in a new composite material wherein the surface of the treated spinel has a heterogeneous surface composition composed of regions of primarily manganese oxide and regions of primarily cobalt oxide. Such a material has the properties of much greater capacity retention, particularly at high temperature, as compared to the base treated material.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for improving the cycle life and capacity of non-aqueous lithium ion cells and batteries, comprising:
    treating the surface of a base lithium manganese oxide spinel configured for use as a cathode in non-aqueous lithium ion cells and batteries with a lithium transition metal oxide by,
    weighing out and mixing together, without adding any solvent, powders of the base lithium manganese oxide material with powders of the precursors for another lithium metal oxide phase that include a combination of or at least one of lithium nitrate, lithium acetate, lithium formate, lithium hydroxide, lithium oxide, cobalt nitrate, cobalt acetate, cobalt formate, cobalt hydroxide, and cobalt oxide as a lithium transition metal oxide precursor;
    adding the mixture obtained in the step of mixing to partially coat said base lithium manganese oxide spinet; and
    after the step of adding, then firing the mixture in air at a temperature in the range of 300° C. to 800° C. without any prior attempt at drying such that a protective layer is formed on said base lithium manganese oxide spinel;
    wherein, the component ratio of the powders used in the step of weighing and mixing is such that the formation of a final treated cathode comprises 1%-8%, by weight, lithium transition metal oxide surface treatment phase being added to the base lithium manganese oxide spinel; and
    wherein, a cathode with a stabilized substrate surface is provided for incorporation into non-aqueous lithium ion cells and batteries that is resistant to capacity loss at high temperatures, that has a high rate capability, and that can be safely overcharged.

* * * * *